United States Patent

Mühlfeld et al.

Patent Number: 5,496,909
Date of Patent: Mar. 5, 1996

[54] POLYURETHANE MOLDING COMPOUND AND BIODEGRADABLE FILAMENTS MANUFACTURED FROM SUCH MOLDING COMPOUND

[75] Inventors: Horst Mühlfeld, Grasellenbach; Lieselotte Klein, Mannheim; Robert Groten, Weinheim, all of Germany

[73] Assignee: Firma Carl Freudenberg, Weinheim, Germany

[21] Appl. No.: 257,752

[22] Filed: Jun. 9, 1994

[30] Foreign Application Priority Data

Jun. 11, 1993 [DE] Germany ............... 43 19 439.7

[51] Int. Cl.⁶ .................. C08G 18/40; C08G 18/42
[52] U.S. Cl. .................. 528/76; 528/906; 428/364
[58] Field of Search .............. 528/76, 906; 428/364

[56] References Cited

U.S. PATENT DOCUMENTS

| | | | |
|---|---|---|---|
| 3,684,770 | 8/1972 | Meisert et al. | 528/906 |
| 4,980,445 | 12/1990 | van der Wal | 528/76 |
| 5,258,422 | 11/1993 | Chang et al. | 523/124 |

OTHER PUBLICATIONS

Saunders & Frisch; Polyurethanes, 1964, p. 702.

*Primary Examiner*—James J. Seidleck
*Assistant Examiner*—R. F. Johnson
*Attorney, Agent, or Firm*—Kenyon & Kenyon

[57] ABSTRACT

A thermoplastic polyurethane molding compound, which is capable of being spun from the melt into filaments, is able to be enzymatically degraded within a few weeks. The compound contains exclusively linear components, and can be prepared from 100 parts by weight of a polyol combination from 70 to 90 parts by weight of polyester-polyol having a molecular weight of 2000, based on adipic acid with ethane diol, butane diol, hexane diol, neopentyl glycol, or diethylene glycol, and from 10 to 30 parts by weight of polyether polyol based on polyethylene glycol having a molecular weight of 800 to 4000. Also contained are 1,6-hexamethylene diisocyanate or, in its place, isophorone diisocyanate, or dicyclohexylmethane 4,4'-diisocyanate in an equivalency ratio to the entire polyol of the polyol combination of 2.8:1.0 to 12.0:1.0; as well as, as chain lengtheners, 1,4-butane diol and/or 1,6-hexane diol with an equivalency ratio to the entire polyol of the polyol combination of 1.75:1.0 to 11.3:1.0. The NCO coefficient, formulated from the quotients of the equivalency ratios of isocyanate groups multiplied by 100 and of the sum of the hydroxyl groups from the polyols and chain lengtheners, is from 97 to 99.

2 Claims, No Drawings

POLYURETHANE MOLDING COMPOUND AND BIODEGRADABLE FILAMENTS MANUFACTURED FROM SUCH MOLDING COMPOUND

BACKGROUND OF THE INVENTION

1. Field of the Invention

The invention relates generally to a polyurethane molding compound. More particularly, the invention pertains to a biodegradable and thermoplastically processible polyurethane molding compound, which is capable of being spun, in particular using the melt spinning technique, into elastic filaments.

2. Description of Related Art

Nonwoven [formed] fabrics made of elastic spun filaments constitute the main component of incontinence articles, such as diapers and sanitary napkins, because of their excellent strength properties and their good wear comfort.

Since disposable products are involved, particular attention must be paid to the biodegradability of such filament-formed fabric. However, in spite of the excellent capability of linear polyurethane molding compounds, i.e., polyurethane molding compounds made of purely aliphatic components, to be spun into filaments having excellent elasticity and strength properties for precisely those articles named above, a disadvantage of these molding compounds is that they are not sufficiently biodegradable. Thus, DE 42 03 307 C1 describes a polyurethane molding compound that is capable of being processed thermoplastically in sinter-powder form to manufacture leather-grain sintered sheeting for dashboards. This molding compound can be manufactured exclusively from linear components, namely from 100 parts by weight of a polyol mixture from an aliphatic polycarbonate diol and from a polyester diol based on adipic acid, hexane diol and neopentyl glycol, and from hexamethylene diisocyanate. 1,6 butane diol serves as a chain lengthener. The NCO coefficient, formulated from the quotients of the equivalency ratios of isocyanate groups multiplied by 100 and of the sum of all hydroxyl groups contained in the molding compound, inclusive of those of the chain lengtheners, lies at 97 to 99, which signifies a diisocyanate deficiency.

Nothing is said about the capacity of this molding compound to be spun into continuous filaments. However, tests did, in fact, reveal that the compound can also be processed into filaments because of its low-viscosity melt. These types of polyurethanes are especially resistant to ageing because of their high concentration of polycarbonate in the molecular skeleton.

When no additional protective agents are used, the effect of moisture causes pure polyester polyurethanes having the polyol component based on adipic acid and glycol to be hydrolytically degraded. The polyester component in the soft segment is saponified by water, and the polyurethane chains split into shorter units. This degradation occurs even under mild conditions, i.e., at temperatures and at an atmospheric humidity, which correspond more or less to the climatic conditions of interest herein.

Tests showed a reduction in the stability of polyester polyurethanes by 50% after a storage life of four years in a normal climate (23° C., 50% relative humidity). Apparently, the resulting low-molecular breakdown products, predominantly polyurethane hard segments, are very resistant to any further degradative effect of moisture and oxygen.

SUMMARY OF THE INVENTION

The object of the invention is to provide a thermoplastic polyurethane molding compound, which consists only of aliphatic components and which, because of its linearity, is capable of being spun into elastic filaments out of the melt and which, in contrast to known molding compounds of this type, is so biodegradable that the products manufactured from it, when stored at disposal sites, decompose entirely within a few weeks in the first degradation [decomposition] stage because of hydrolysis and, in a subsequent degradation [decomposition] step, due to enzymes and microorganisms.

In accordance with the invention, a polyurethane molding compound having these characteristics is obtainable by reacting 100 parts by weight of a polyol mixture with 1,6-hexamethylene diisocyanate, isophoron diisocyanate or dicyclohexylmethane 4,4'-diisocyanate and diol-chain-lengthening means. The NCO coefficient, formulated from the quotients of the equivalency ratios of isocyanate groups multiplied by 100 and of the sum of the hydroxyl groups from the polyol mixture and the chain-lengthening means, is from to 97 to 99. The polyol mixture consists of 70 to 90 parts by weight of polyester polyol having a molecular weight of 2000, based on adipic acid with ethane diol, butane diol, hexane diol, diethylene glycol or neopentyl glycol, as well as of 10 to 30 parts by weight of polyether polyol on the basis of polyethylene glycol having a molecular weight of 800 to 4000. The chain lengthening means is 1,4-butane diol and/or 1,6-hexane diol. The 1,6-hexamethylene diisocyanate, isophorone diisocyanate or dicyclohexylmethane 4,4'-diisocyanate are present in an equivalency ratio to the polyol mixture of 2.8:1.0 to 12.0:1.0. The chain lengthening means is present in an equivalency ratio to the polyol mixture of 1.75:1.0 to 11.3:1.0. The invention also includes filaments spun from these polyurethane molding compounds.

The requirement for thermoplasticity and for the capacity to spin uniform, elastic, stable filaments from the melt is fulfilled by the generally known measure of synthesizing the molding compound from purely linear, i.e., exclusively aliphatic components. However, prior to the invention, there has been no known way on how to selectively effect such a composition, in order to achieve the biodegradability required in many applications. Also, heretofore, no thermoplastic, biodegradable, or spinnable polyurethane molding compounds have been disclosed.

DETAILED DESCRIPTION OF THE INVENTION

The polyol mixture for preparing the molding compound in accordance with the invention contains, on the one hand, 70 to 90 parts by weight of polyester polyol having a molecular weight of 2000, on the basis of adipic acid with ethane diol or with butane diol, hexane diol, diethylene glycol or neopentyl glycol. On the other hand, the polyol mixture contains 10 to 30 parts by weight of polyether polyol on the basis of polyethylene glycol having a molecular weight of 800 to 4000.

In an equivalency ratio of 2.8:1.0 to 12.0:1.0 to the polyol mixture, the polyurethane molding compound contains, in addition, 1,6-hexamethylene diisocyanate, isophorone diisocyanate or dicyclohexylmethane 4,4'-diisocyanate.

Serving as chain lengtheners are 1,4-butane diol or 1,6-hexane diol, alternately or in combination, in an equivalency ratio to the polyol mixture of 1.75:1.0 to 11.3:1.0. The NCO coefficient, formulated from the quotients of the equivalency ratios of isocyanate groups multiplied by 100 and the sum of the hydroxyl groups from the polyol combination and the chain lengthener must amount to 97 to 99.

This polyurethane molding compound can easily be heated to form a homogeneous melt, from which molecularly uniform filaments can be extrusion-spun. The spinning capacity is furthered by the low-viscosity of the melt above the melting point.

Because of the excellent crystallizing properties of the melt, the very elastic filaments are able to be processed into high-strength [stability] formed fabrics having a low mass per unit area. The elastic properties transferred to the formed fabric make it extremely suited for manufacturing incontinence articles.

The special and unexpected advantage of the molding compound is the rapid and complete biodegradability by means of enzymes. Only aliphatic and, thus, non-toxic intermediate products are formed, even during degradation [decomposition], because of the purely aliphatic structural elements.

A very rapid splitting of the polyurethane chain occurs in the earth-enzyme medium at only 30% relative humidity and 23° C., due to hydrolysis of the polyester segments. In a further degradation [decomposition] step, the polyurethane fragments are entirely decomposed by enzymes. This appears to be caused by the hydrophilic groups in the polyurethane soft segment of the molding compound according to the invention.

In experiments, in which formed fabrics, whose filaments had been manufactured from the polyurethane molding compound according to the invention, were buried in the earth, a reduction in strength was manifested under the above conditions only after a few days. Subsequently a discoloration with pitting resulted and—after eight weeks—the complete dissolution [disintegration] of the formed fabrics resulted.

Decomposition experiments on comparable aliphatic polyester polyurethanes without hydrophilic polyether groups in the polyurethane soft segment revealed a significant reduction in strength properties only after four months, with no clear breakdown of the polyurethane.

Due to the selected NCO coefficient of 97–99, whereby isocyanate is in deficiency, and due to the manufacturing of the molding compound using the single-stage method, secondary reactions leading to gel-like and partially branched polymer constituents are precluded, and a perfect melt for the spinning proces is attained.

The following exemplary formulations produce especially favorable melt properties for the polyurethane molding compound. However, these Examples should be regarded in an illustrative rather than a restrictive sense.

EXAMPLE 1

Composition of the mixture:

90.0 parts by weight of polyester diol on the basis of adipic acid and ethane diol 10.0 parts by weight of polyethylene glycol having a molecular weight of 2000

11.88 parts by weight of 1,4-butane diol 30.0 parts by weight of 1,6-hexamethylene diisocyanate Melt properties of the molding compound:

flash point: 170° C.

melt [flow] index according to DIN 53735 at 2.16 kg load, measured at
180° C.: 32 g/10 min
190° C.: 95 g/10 min
200° C.: 175 g/10 min

EXAMPLE 2

Composition of the mixture:

90.0 parts by weight of polyester diol based on adipic acid and ethane diol 10.0 parts by weight of polyethylene glycol having a molecular weight of 800

11.2 parts by weight of 1,4-butane diol 30.0 parts by weight of 1,6-hexamethylene diisocyanate Melt properties of the molding compound:

flash point: 160° C.

melt [flow] index according to DIN 53735 at 2.16 kg load, measured at
170° C.: 42 g/10 min
180° C.: 79 g/10 min
190° C.: 137 g/10 min

EXAMPLE 3

Composition of the mixture:

80.0 parts by weight of polyester diol on the basis of adipic acid and ethane diol 20.0 parts by weight of polyethylene glycol having a molecular weight of 800

5.27 parts by weight of 1,4-butane diol 6.91 parts by weight of hexane diol 30.0 parts by weight of 1,6-hexamethylene diisocyanate Melt properties of the molding compound:

flash point: 125° C.

melt [flow] index according to DIN 53735 at 2.16 kg load, measured at
140° C.: 28 g/10 min
150° C.: 52 g/10 min
160° C.: 96 g/10 min
170° C.: 137 g/10 min

What is claimed is:

1. A biodegradable, elastic filament of a thermoplastic polyurethane molding compound which is the reaction product of 100 parts by weight of a polyol mixture with 1,6-hexamethylene diisocyanate, isophorone diisocyanate or dicyclohexylmethane 4,4'-diisocyanate and a diol-chain-lengthener, having an NCO coefficient, determined from the quotients of the equivalency ratios of isocyanate groups multiplied by 100 and of the sum of the hydroxyl groups from the polyol mixture and the chain-lengthener, of from 97 to 99, wherein the polyol mixture comprises 70 to 90 parts by weight of a polyester polyol having a molecular weight of 2000, based on adipic acid with ethane diol, butane diol, hexane diol, diethylene glycol or neopentyl glycol, and 10 to 30 parts by weight of a polyethylene glycol having a molecular weight of 800 to 4000, wherein the chain lengthener is 1,4-butane diol or 1,6-hexane diol, and wherein the diisocyanate is present in an equivalency ratio to the polyol mixture of 2.8:1.0 to 12.0:1.0 and the chain lengthener is present in an equivalency ratio to the polyol mixture of 1.75:1.0 to 11.3:1.0.

2. The filament according to claim 1 characterized by the property that it is completely biodegraded within eight weeks upon being buried in earth at 30% relative humidity and 23° C.

* * * * *